United States Patent
Devarakonda et al.

(10) Patent No.: US 7,254,578 B2
(45) Date of Patent: Aug. 7, 2007

(54) CONCURRENCY CLASSES FOR SHARED FILE SYSTEMS

(75) Inventors: Murthy V. Devarakonda, Yorktown Heights, NY (US); John T. Robinson, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 10/315,820

(22) Filed: Dec. 10, 2002

(65) Prior Publication Data
US 2004/0111422 A1 Jun. 10, 2004

(51) Int. Cl.
*G06F 17/30* (2006.01)
(52) U.S. Cl. .............................................. 707/8; 707/1
(58) Field of Classification Search .................... 707/1, 707/2, 7–10, 200, 201, 6; 710/200
See application file for complete search history.

(56) References Cited

U.S. PATENT DOCUMENTS 5,615,373 A 3/1997 Ho 6,546,443 B1 * 4/2003 Kakivaya et al. ........... 710/200
6,889,249 B2 * 5/2005 Miloushev et al. ......... 709/213

OTHER PUBLICATIONS

J. T. Robinson A Fast General Purpose Hardware Synchronization Mechanism, Proceedings of the 1985 ACM-SIGMOD International Conference on Management of Data, pp. 122-130.

* cited by examiner

*Primary Examiner*—Don Wong
*Assistant Examiner*—Marc Filipczyk
(74) *Attorney, Agent, or Firm*—Lisa Yamonaco; David Aker (57) ABSTRACT

A method, apparatus and computer product wherein means and mechanisms are provided whereby, in a distributed or clustered shared file system, (1) concurrency classes may be defined specifying granularity of locking, whether locks are cached, and whether modified data is written-through at the completion of updates, (2) certain files, file types, or files and/or file types as used by given applications or classes of applications, may be associated with concurrency classes, and (3) for each usage of a file by an application, the associated concurrency class determines a policy for choosing specific concurrency and coherency control mechanisms to be used for accessing the given file.

34 Claims, 4 Drawing Sheets

Figure 1.

Concurrency Classes Table

| 210 Name | 220 Granularity | 230 Cache Locks | 240 Write-through | 250 Comments |
|---|---|---|---|---|
| default | file | yes | no | mostly readers at file level, or read/write but not highly shared |
| shared file | file | yes | yes | some write sharing and read sharing at file level |
| update file | file | no | yes | many shared updates at file level |
| default data | block | yes | no | mostly readers at block level, or block reads/writes but not highly shared |
| shared data | block | yes | yes | some write sharing and read sharing at block level |
| update data | block | no | yes | many shared updates at block level |

Figure 2.

File / Application Concurrency Class Policy Table

| 310<br>File | 320<br>Application | 330<br>Concurrency Class | 340<br>Comments |
|---|---|---|---|
| * | * | default | |
| *.exe | * | default | executable files (applications) |
| *.doc | help | default | documentation |
| * | sysstat | update file | periodically updated system status files |
| *.dat | netstat | shared file | files used by netstat with network status info |
| *.ndx | man* | default data | index files used by online user manual application programs |
| *.dbf | dbquery | shared data | database files used by dbquery application |
| *.dbf | dbupd | update data | database files used by dbupd application |

CONCURRENCY CLASSES FOR SHARED FILE SYSTEMS

FIELD OF THE INVENTION

The present invention generally relates to computer systems and to concurrency and coherency control in distributed and clustered file systems in which files are shared. More specifically, it relates to the automatic choice of appropriate concurrency and coherency control mechanisms for various classes of files according to their usage.

BACKGROUND OF THE INVENTION

There has been extensive prior work in the design and implementation of distributed and clustered file systems. For example, the book "Catalogue of Distributed File/Operating Systems", by Uwe Borghoff, published by Springer-Verlag, 1992, covers thirteen "traditional" distributed file systems, three "object-oriented" distributed file systems, twenty-three "traditional" distributed operating systems (where it is understood that an operating system may contain a file system as a component), eighteen "object-oriented" distributed operating systems, as well as a number of closely related systems and related projects. Among the distributed file systems covered are for example NFS (network file system) and AFS (Andrew file system), later versions of which are still in use at the current time.

Early versions of some distributed file systems did not support concurrent access. For example, there were no mechanisms for locking a file opened for writing by two or more independent applications so as to prevent inconsistent data. A related problem is that of coherency control: if file data is cached, it is necessary in most cases that applications be provided with the most recent version of the data when reading from the file, and this data may reside in the cache of a client machine rather than on the file server. Here, the context implies that the term "cache" is being used to refer to a system software managed cache residing in the main memory of a client machine or file server (as opposed to processor caches for example, which in general are transparent to software and managed by hardware means).

Current distributed file systems generally support both concurrency and coherency control. Typically, files are locked at some granularity, for example at the level of the entire file or at block granularity, and locks are held on data in a client machine's cache as long as the data resides in the cache, even after applications using the data have closed the file. The latter technique has been referred to as lock caching (or lock retention), and is used for coherency control. The technique has been well-known for some time; for example in the context of multi-system data sharing in database systems, in the paper "A Fast General-Purpose Hardware Synchronization Mechanism" by J. T. Robinson, appearing in the Proceedings of the 1985 ACM-SIGMOD International Conference on Management of Data, on page 124 of the conference proceedings the following technique is described: "In order to prevent a data object that is in the cache of processor P1 being invalidated due to an update made to the object on processor P2, it may be desired to have the local concurrency control of P1 continue to hold a lock on the object as long as it is in the cache, even after all local transactions accessing the object have completed" (where again "cache" in this context refers to a software managed cache residing in main memory). In order to release a cached lock held on modified data, the data must be written to the file server prior to releasing the lock, in order to ensure that the most recent version of the modified data is available to other client machines.

Potential performance problems resulting from lock caching, and from caching modified data that may be required by applications running on other client machines, have been recognized in the prior art. For example, in "Data Lock Management in a Distributed File Server System Determines Variable Lock Lifetime in Response to Request to Access Data Object". U.S. Pat. No. 5,615,373, 1993, mechanisms are described in which locks are held for variable periods of time. This can be thought of as lock caching in which, however, cached locks are automatically released after a specified interval (where the interval may be determined, for example, by measured read/write ratios for files). However, a number of important problems remain.

Some of these problems are as follows. Typically, the usage patterns of certain file types, or certain files as used by given applications, are known in advance. A simple example is that program files (that is executable files) and small documentation files are typically accessed in read-only mode at file granularity by every client machine. A second example is a system status file that is periodically updated by every client machine in the system: for such files it would be desirable not to cache locks, and to write through changes to the file on each update (as opposed to leaving the updated version in a client machine's cache, and only writing through changes on a lock conflict caused by the file being opened on another client machine). A third example is as follows: even though a certain file may be known to be highly shared in read/write mode, it may also be known that the usage pattern of the file is such that it is relatively infrequently accessed, and typically accessed by a different client machine on each subsequent access. In such a case it would be desirable to lock at file granularity, not to cache locks, and to write-through changes.

Another problem is granularity of locking: certain file types, or certain files used by given applications, are known in advance to be accessed at the file level (the entire file is opened, read, and possibly written) or at the block level (individual blocks within the file are read and possibly written, as in for example files implementing certain types of indexes).

Yet another problem is guaranteeing a level of service (for example, response time) for given applications and associated file types. For example, in the case of files used by an OLTP (online transaction processing) application, it may be desirable to lock at the block level, not to cache locks, and to write-through changes to files at the completion of each update. In the case of this particular example, such a policy is designed to optimize performance and minimize the response time for each client machine running the OLTP application (since it is known in advance that certain files used by the OLTP application are highly shared among multiple client machines in read/write mode at block granularity). There are many other examples in which a system administrator may wish to specify, for example, the granularity of locking, whether locks are cached, and whether modified data is written-through to a shared file server (or in the case of a storage area network, to a shared device), for a given application program and associated file types with known usage patterns, in order to optimize performance and provide varying levels of service.

SUMMARY OF THE INVENTION

It is therefore an aspect of the present invention to provide means and mechanisms whereby the aforementioned problems can be solved.

Means and mechanisms are provided whereby, in a distributed or clustered shared file system. (1) concurrency classes may be defined specifying granularity of locking, whether locks are cached, and whether modified data is written-through at the completion of updates, (2) certain files, file types, or files and/or file types as used by given applications or classes of applications, may be associated with concurrency classes, and (3) for each usage of a file by an application, the associated concurrency class determines a policy for choosing specific concurrency and coherency control mechanisms to be used for accessing the given file.

BRIEF DESCRIPTION OF THE DRAWINGS

These and other aspects, features, and advantages of the present invention will become apparent upon further consideration of the following detailed description of the invention when read in conjunction with the drawing figures, in which.

DESCRIPTION OF THE INVENTION

In order to automatically determine concurrency and coherency control mechanisms for accessing files in a distributed or clustered shared file system according to their usage by specified applications, two system management tables will be used: (1) a first table (the CCT, as described below) for defining a number of concurrency classes, where a concurrency class is a named method specifying (for example) granularity of locking, whether locks are cached, and whether cached data is written-through to a file server on updates; and (2) a second table (the FACCPT, also as described below) for defining associations between files, file types, files and/or file types and specified applications, or files and/or file types and classes of applications, with a concurrency class. At the time a file is opened, its concurrency class is determined according to its usage from the second table, and the concurrency class thus found determines the specific concurrency and coherency control mechanisms that are then used in subsequent accesses to the file.

Figure 1:
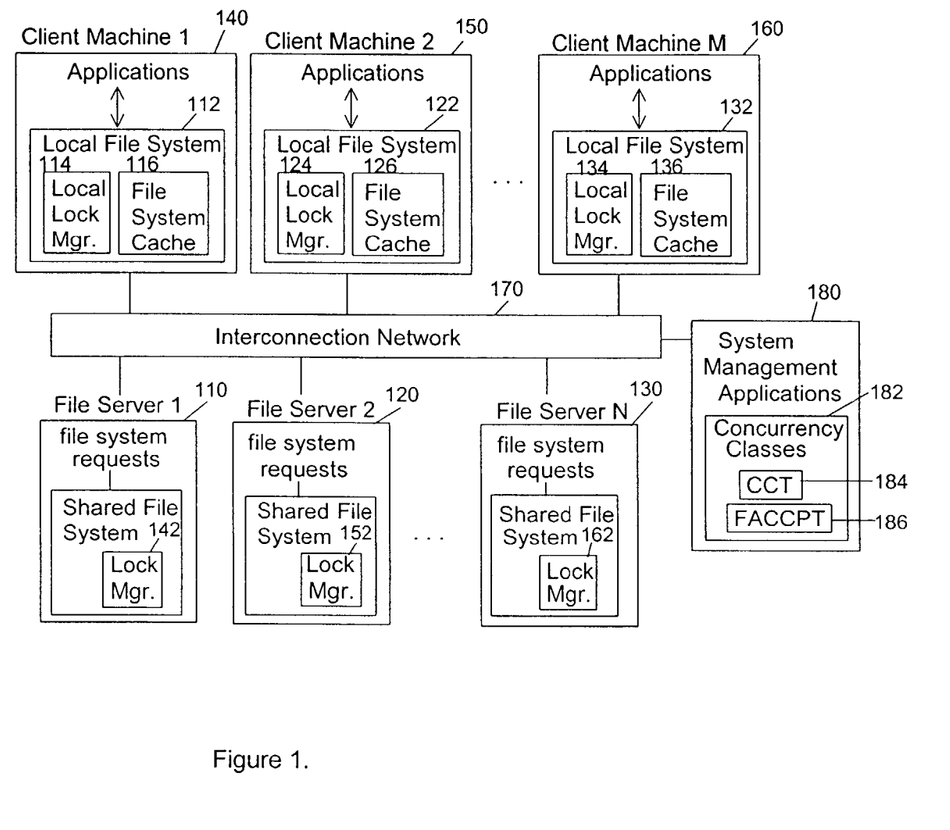
FIG. 1 is a block diagram of an exemplary distributed file system with a system management node.

In more detail, a typical distributed file system is shown in FIG. 1 (together with a system management machine 180, to be subsequently described). There are a number of file servers (110, 120, 130), a number of client machines (140, 150, 160), and an interconnection network 170. For simplicity, hardware details of the client machines and file servers (e.g. processors and memories), storage devices managed by the file servers, file server caches, other interconnection networks (for example, a storage area network), network connections to other networks (for example, Internet connections), display terminals and other devices, and so on, are not shown. Each client machine includes a local file system (112, 122, 132), a local lock manager (114, 124, 134), and a file system cache (116, 126, 136). Applications running on each client machine access the distributed file system consisting of the collection of file servers 110, 120, and 130 by means of the local file systems 112, 122, and 132, which in turn acquire and release locks by means of the local lock managers 114, 124, and 134 respectively, and cache data in local file system caches 116, 126, and 136, respectively. The file servers include file system lock managers (142, 152, 162). Locks may be held by various applications within the local lock managers 114, 124, and 134, but may be held at the client machine ID level within the file system lock managers 142, 152, and 162. As is typical, locks may be held in various modes, for example share mode for read-only access, and exclusive mode for read-write or update access.

System management takes place by means of a number of system management applications. Although in practice these applications could run on the client machines shown in FIG. 1, for simplicity of illustration a system management machine is shown in FIG. 1 as 180. The concurrency classes application is shown as component 182 of the system management machine 180. The concurrency classes application makes use of two tables in order to define and implement system-wide policy-based concurrency and coherency control, where these two tables are the CCT (concurrency classes table) 184 and the FACCPT (file/application concurrency class policy table) 186.

Figure 2:
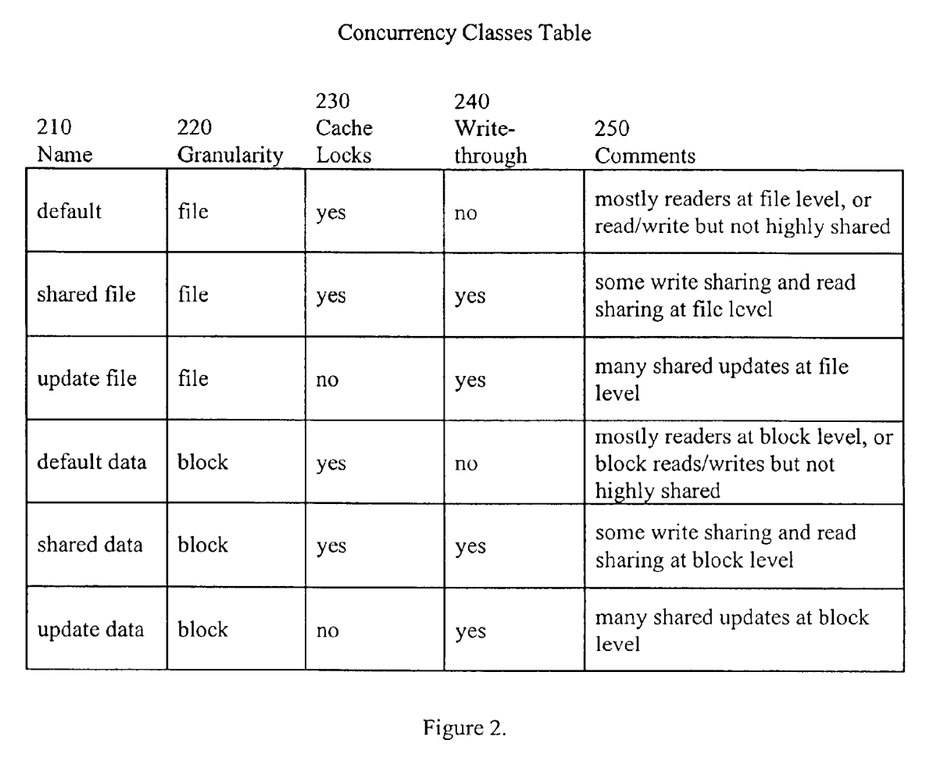
FIG. 2 is an example of a concurrency classes table (CCT).
Figure 3:
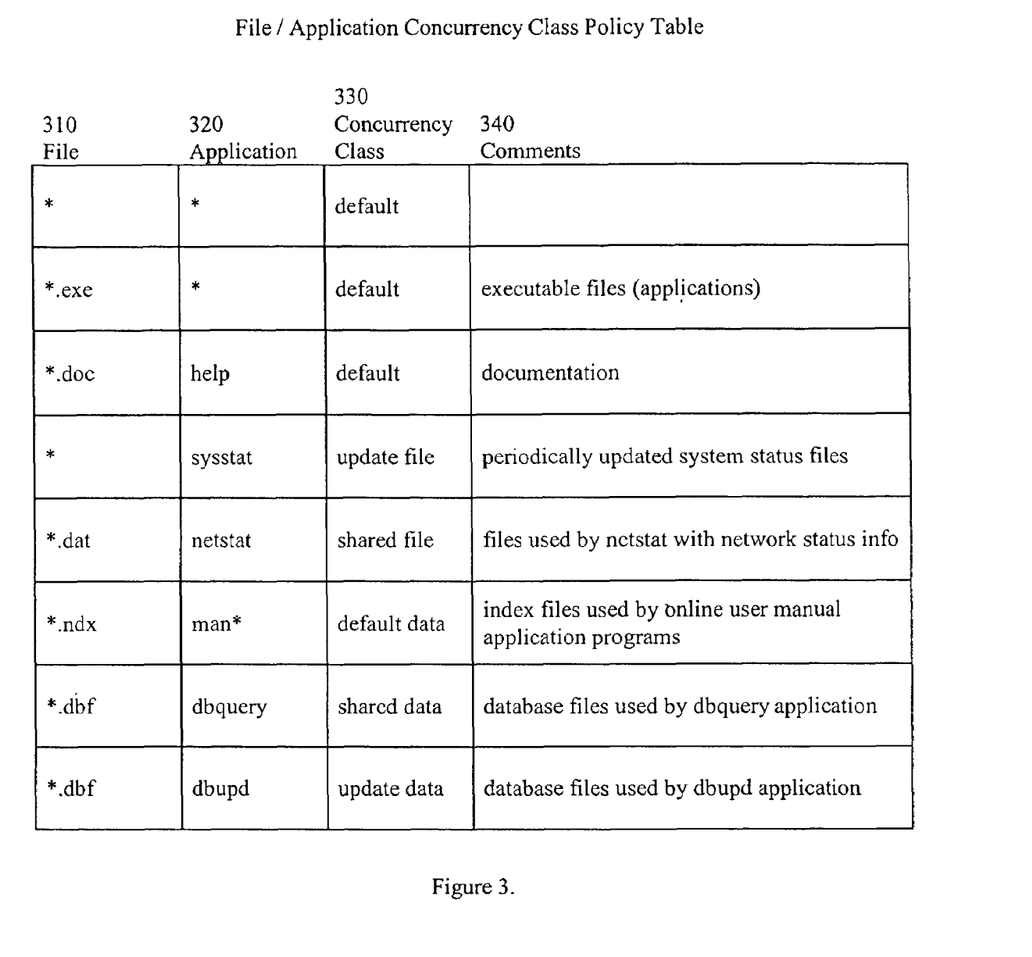
FIG. 3 is an example of a File/Application Concurrency Class Policy Table (FACCPT).

Example contents of the CCT and FACCPT are illustrated in FIGS. 2 and 3, respectively. These tables are dynamic, in that system administrators or other authorized users may add new concurrency classes to the CCT or new file/application concurrency class policy associations to the FACCPT (by using system management applications in a system management machine 180), as desired, in order to optimize system performance, provide various levels of service, or in order to indicate what concurrency class policies should be associated with newly installed applications. Alternatively, authorized applications may modify these tables, in order to install new applications using default concurrency class policies, or in order to automate system optimization.

Referring to FIG. 2, the example CCT has columns for concurrency class name (210), granularity of locking (220), determining whether locks should be cached at client machines by the local lock managers 114, 124, and 134 (230), determining whether modified data should be written-through from the local file system caches 116, 126, and 136 at the completion of updates (240), and comments (250). Each row of the table defines a concurrency class. As shown in FIG. 2, for this example these are: (1) default, file granularity locking, cache locks, do not write through; (2) shared file, file granularity locking, cache locks, write through modified data; (3) update file, file granularity locking, do not cache locks, write through modified data; (4) default data, block granularity locking, cache locks, do not write through; (5) shared data, block granularity locking, cache locks, write through modified data; (6) update data, block granularity locking, do not cache locks, write through modified data. If the file system supports granularities of locking in addition to file and block level (for example, range locks, that is portions of a file that are locked as specified by starting and ending points within the file), then the exemplary CCT of FIG. 2 could be extended to define additional concurrency classes for other possible granularities of locking.

The concurrency classes defined by the CCT are associated with files, file types, files and/or file types as used by given applications, or files and/or file types as used by given classes of applications, by means of the FACCPT 186. Referring to FIG. 3, the FACCPT has columns for file specification (310), application specification (320), concurrency class (330), and comments (340). As is common, an asterisk ("*") is used as a wild card specification, that is, "*" used as a file name or application name matches any file or application, and when combined with other characters matches any character string including the null string in combination with the specified characters. It should be clear that various extensions of this example, such as the use of regular expressions to determine matches, or the use of rule-based mechanisms to determine matches, would naturally occur to those skilled in the art. For simplicity, however, the current example uses only the "*" wild card specification mechanism. Thus, the first row of the table of FIG. 3 indicates that in the absence of another match below in the table, the "default" concurrency class (as defined in the example CCT of FIG. 2) should be used, since in the first column "*" matches any file name and in the second column "*" matches any application name. Continuing with successive rows in the example FACCPT of FIG. 3: the second row indicates that for all *.exe files (which are opened by the operating system in order to execute a program) the "default" concurrency class should be used: the third row indicates that for all *.doc files that are opened by the help program the "default" concurrency class should be used; the fourth row indicates that for any file opened by the sysstat program the "update file" concurrency class should be used: the fifth row indicates that for all *.dat files opened by the netstat program the "shared file" concurrency class should be used: the sixth row indicates that for all *.ndx files opened by any application matching man* the "default data" concurrency class should be used: the seventh row indicates that for all *.dbf files opened by the dbquery program the "shared data" concurrency class should be used; and the eighth (last) row of the table indicates that for all *.dbf files opened by the dbupd program the "update data" concurrency class should be used.

Figure 4:
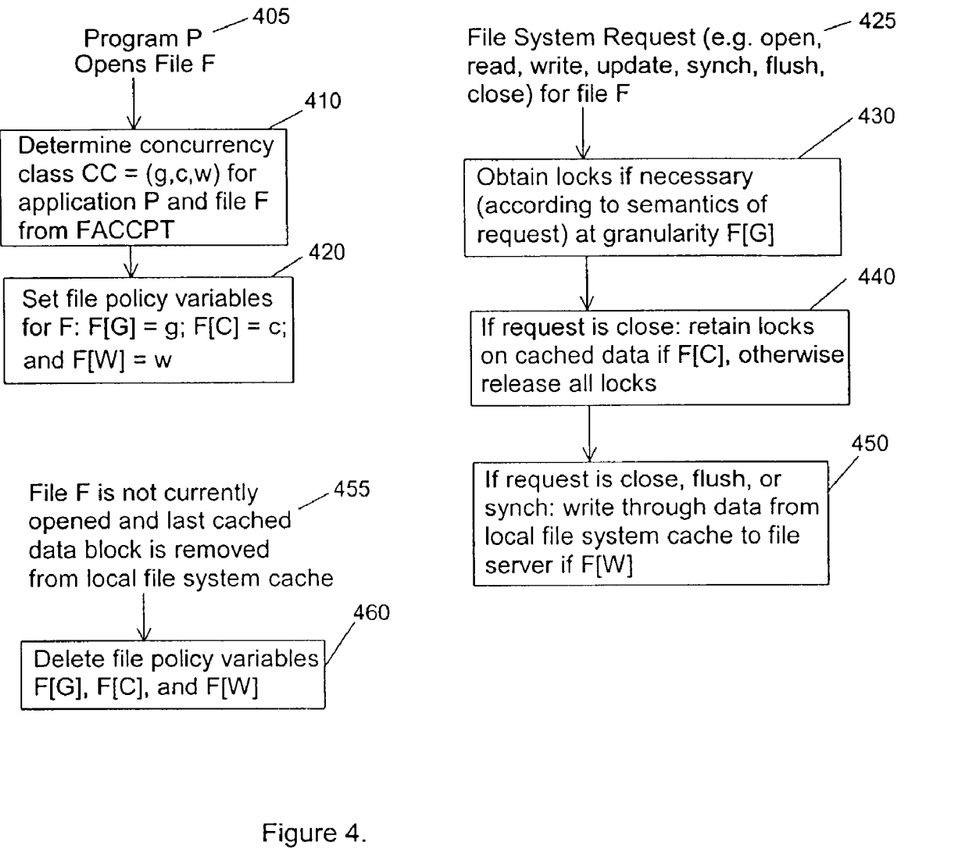
FIG. 4. is a control flow diagram for local file system locking and caching.

FIG. 4 illustrates the use by a local file system of the FACCPT 186 and CCT 184 by as maintained by the concurrency classes application 182 of FIG. 1. For performance reasons, copies of these two tables may be cached locally in the local file systems 112, 122, 132 of FIG. 1. Because the entries in these tables define policies, strict synchronization mechanisms are not required for maintaining multiple copies; that is, the shared file system operates correctly even if there is a delay in propagating updates to the primary copies of these tables as maintained in the system management machine 180 of FIG. 1 to local copies. Therefore when updates are made to these tables (FACCPT and/or CCT), local copies may be updated asynchronously. Returning to FIG. 4, events that trigger processing steps are indicated by 405, 425, and 455. The processing steps that take place in response to these events are indicated by 410 and 420 (in response to event 405). 430, 440, and 450 (in response to event 425) and 460 (in response to event 455). Thus, when a file F is opened by a program (application) P in 405, first the local copy of the FACCPT is examined to find a concurrency class name associated with application P and file F (as explained above), and then using the local copy of the CCT an entry (g.c.w) is found for this concurrency class name (where g is the locking granularity, c is a Boolean indicating whether locks are cached, and w is a Boolean indicating whether cached data is written through), as indicated in step 410. Next, in step 420, policy variables associated with the file F, namely F[G], F[C], and F[W], are set to the corresponding concurrency class values g, c, and w. Having thus initially set policy variables for the file, local file system requests to file F 425 are handled according to these policy variables: locking granularity is determined by F[G] as shown in step 430, locks are cached as determined by F[C] as shown in step 440, and data is written through from the local file system cache as determined by F[W] as indicated in step 450. File policy variables for the file F are maintained as long as F is opened by at least one application or data from F resides in the local file system cache. When F is not opened by any local application and the last cached data block is removed from the local file system cache (455), the policy variables maintained for F may be deleted as indicated in step 460.

Various extensions to the above will naturally occur to those skilled in the art. As an example, the use of "lifetimes" for cached locks, in which a cached lock is automatically released after a predetermined time interval, is known in the prior art (as earlier described). It is a straightforward extension to include additional concurrency/coherency control policy information in the CCT as illustrated in FIG. 2, such as the aforementioned lock lifetimes, which could take on values of "none" (i.e. lock lifetimes are not used), specific time intervals (e.g. "10 seconds"), or time intervals based on formulas (using information such as measured read/write ratios for example). Other possible extensions include adding additional conditions to the associations between files and applications with concurrency classes in the FACCPT. For example, an "owner" column could be added to this table, with "u" indicating the user ID owning the file, "g" indicating a member of a group associated with the user ID owning the file, and "o" indicating all other user IDs, and different concurrency classes could be associated with the file according to whether the file is opened by the owner, the owner's group, or others. Similarly, the FACCPT table could be extended to associate different concurrency classes with files depending on whether the file is currently not opened by any other application or whether the file is currently opened by multiple applications. Having given examples of several possible extensions, those skilled in the art will recognize that these extensions and others are within the spirit and scope of the invention, as defined by the appended claims.

Variations described for the present invention can be realized in any combination desirable for each particular application. Thus particular limitations, and/or embodiment enhancements described herein, which may have particular advantages to the particular application need not be used for all applications. Also, it should be realized that not all limitations need be implemented in methods, systems and/or apparatus including one or more concepts of the present invention.

The present invention can be realized in hardware, software, or a combination of hardware and software. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. The concepts of this invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art. Thus, it should be understood that the embodiments has been provided as an example and not as a limitation. The scope of the invention is defined by the appended claims.

Having thus described our invention, what we claim as new and desire to secure by Letters Patent is as follows:

1. In a distributed computer system with a shared file system, a method for managing concurrency and coherency of files, comprising:
    defining a number of concurrency classes in a concurrency class table;
    specifying files and applications to be associated with each concurrency class in a file/application concurrency class policy table; and
    determining granularity of locking, caching of locks, and write-through of cached data, to a file server, policies to be used for files and applications in accordance with an associated concurrency class, wherein said concurrency classes include:
    a default concurrency class in which granularity is at the file level, a cache lock is used, and there is no write-through;
    a shared file concurrency class in which granularity is at the file level, a cache lock is used, and there is write-through;
    an update file concurrency class in which granularity is at the file level, no cache lock is used, and there is write-through;
    a default data concurrency class in which granularity is at the block level, a cache lock is used, and there is no write-through;
    a shared data concurrency class in which granularity is at the block level, a cache lock is used, and there is write-through; and
    an update data concurrency class in which granularity is at the block level, no cache lock is used, and there is write-through.

2. The method as recited in claim 1, wherein the concurrency class further specifies lifetime of cached locks.

3. The method as recited in claim 1, further comprising updating the concurrency table with a new concurrency class.

4. The method as recited in claim 1, further comprising defining an association between an item to be processed and a concurrency class.

5. The method as recited in claim 4, wherein the items processed comprise at least one of files, file types, files and/or file types, specified applications, and classes of applications.

6. The method as recited in claim 5, wherein an association table is accessed to determine said association.

7. The method as recited in claim 6, further comprising adding new associations to said association table.

8. The method as recited in claim 4, wherein when no association is defined for an item, a default concurrency class is used.

9. The method as recited in claim 4, wherein a factor to be considered in defining said association is an owner of the item, and a relationship between a party accessing the item and the owner.

10. The method as recited in claim 4, wherein a factor to be considered in defining said association is a party accessing the item, where a party is identified by a user identification and a group identification.

11. The method as recited in claim 1, wherein the file/application concurrency class policy table comprises indications that:
    in the absence of a match in the file/application concurrency class policy table, and for all executable and documentation files, the default concurrency class is used;
    for any other files having a match in the file/application concurrency class policy table and opened by a program, one of the update file, shared file, default data, shared data, and update data concurrency classes is used.

12. A computer system having at least one file server and a plurality of clients served by said at least one file server, wherein files provided by said at least one file server are shared by said clients, said system comprising:
    a file manager for managing coherency and concurrency of the files, said file manager including:
    a storage including a concurrency class table for defining a number of concurrency classes, and a file/application concurrency class policy table for specifying files and applications to be associated with each concurrency class; and
    apparatus for execution of granularity of locking, caching of locks, and write-through of cached data, to a file server, policies to be used for files and applications in accordance with an associated concurrency class, wherein said concurrency classes include:
    a default concurrency class in which granularity is at the file level, a cache lock is used, and there is no write-through;
    a shared file concurrency class in which granularity is at the file level, a cache lock is used, and there is write-through;

an update file concurrency class in which granularity is at the file level, no cache lock is used, and there is write-through;

a default data concurrency class in which granularity is at the block level, a cache lock is used, and there is no write-through;

a shared data concurrency class in which granularity is at the block level, a cache lock is used, and there is write-through; and an update data concurrency class in which granularity is at the block level, no cache lock is used, and there is write-through.

13. The system as recited in claim 12, wherein the concurrency class further specifies lifetime of cached locks.

14. The system as recited in claim 12, wherein said concurrency class table includes a default concurrency class in which granularity is at the file level, a cache lock is used and there is no write-through.

15. The system as recited in claim 12, further comprising a system management application for providing access to said storage for updating the concurrency table with a new concurrency class.

16. The system as recited in claim 12, further comprising additional storage for storing an association between an item to be processed and a concurrency class.

17. The system as recited in claim 16, wherein the items processed comprise at least one of files, file types, files and/or file types, specified applications, and classes of applications.

18. The system as recited in claim 17, wherein when no association is defined for an item, a default concurrency class is specified.

19. The system as recited in claim 16, wherein a factor to be considered in defining said association is an owner of the item, and a relationship between a party accessing the item and the owner.

20. The system as recited in claim 16, wherein a factor to be considered in defining said association is a party accessing the item, where a party is identified by a user identification and a group identification.

21. The system as recited in claim 16, comprising a system management application for accessing an association table to determine said association.

22. The system as recited in claim 21, further comprising a system management application for adding new associations to said association table.

23. The system as recited in claim 12, wherein the file/application concurrency class policy table comprises indications that:

in the absence of a match in the file/application concurrency class policy table, and for all executable and documentation files, the default concurrency class is used;

for any other files having a match in the file/application concurrency class policy table and opened by a program, one of the update file, shared file, default data, shared data, and update data concurrency classes is used.

24. An article of manufacture comprising a computer usable medium having computer readable program code means embodied therein for causing a computer to manage concurrency and coherency of files, said computer readable program code comprising:

code for defining a number of concurrency classes in a concurrency class table;

code for specifying files and applications to be associated with each concurrency class in a file/application concurrency class policy table; and code for determining granularity of locking, caching of locks, and write-through of cached data, to a file server, policies to be used for files and applications in accordance with an associated concurrency class, wherein said concurrency classes include:

a default concurrency class in which granularity is at the file level, a cache lock is used, and there is no write-through;

a shared file concurrency class in which granularity is at the file level, a cache lock is used, and there is write-through;

an update file concurrency class in which granularity is at the file level, no cache lock is used, and there is write-through;

a default data concurrency class in which granularity is at the block level, a cache lock is used, and there is no write-through;

a shared data concurrency class in which granularity is at the block level, a cache lock is used, and there is write-through; and an update data concurrency class in which granularity is at the block level, no cache lock is used, and there is write-through.

25. The article of manufacture as recited in claim 24, wherein the code for determining locking and caching policies further specifies lifetime of cached locks.

26. The article of manufacture as recited in claim 24, further comprising code for updating the concurrency table with a new concurrency class.

27. The article of manufacture as recited in claim 24, further comprising code for defining an association between an item to be processed and a concurrency class.

28. The article of manufacture as recited in claim 27, wherein the computer program code includes code for processing items which comprise at least one of files, file types, files and/or file types, specified applications, and classes of applications.

29. The article of manufacture as recited in claim 28, wherein the code for defining an association is an association table.

30. The article of manufacture as recited in claim 27, further comprising code for adding new associations to said association table.

31. The article of manufacture as recited in claim 27, wherein when no association is defined for an item, the computer readable program code defines a default concurrency class.

32. The article of manufacture as recited in claim 27, further comprising code for considering an owner of the item, and a relationship between a party accessing the item and the owner, in defining said association.

33. The article of manufacture as recited in claim 27, further comprising code for considering a party accessing the item, where a party is identified by a user identification and a group identification, in defining said association.

34. The article of manufacture as recited in claim 24, wherein the file/application concurrency class policy table comprises indications that:

in the absence of a match in the file/application concurrency class policy table, and for all executable and documentation files, the default concurrency class is used;

for any other files having a match in the file/application concurrency class policy table and opened by a program, one of the update file, shared file, default data, shared data, and update data concurrency classes is used.

* * * * *